US010111069B1

(12) United States Patent
Dawson-Haggerty et al.

(10) Patent No.: US 10,111,069 B1
(45) Date of Patent: Oct. 23, 2018

(54) SYSTEM, METHOD, AND COMPUTER PROGRAM FOR TRANSMITTING OCCUPANCY DATA FROM SENSORS TO A REMOTE SERVER

(71) Applicant: Building Robotics, Inc., Oakland, CA (US)

(72) Inventors: Stephen Dawson-Haggerty, Piedmont, CA (US); Andrew Krioukov, Berkeley, CA (US)

(73) Assignee: Building Robotics, Inc., Oakland, CA (US)

( * ) Notice: Subject to any disclaimer, the term of this patent is extended or adjusted under 35 U.S.C. 154(b) by 0 days.

(21) Appl. No.: 15/728,027

(22) Filed: Oct. 9, 2017

(51) Int. Cl.
  *G08B 1/08* (2006.01)
  *H04W 4/70* (2018.01)
  *G08B 21/22* (2006.01)
  *H04W 8/00* (2009.01)

(52) U.S. Cl.
  CPC .............. *H04W 4/70* (2018.02); *G08B 21/22* (2013.01); *H04W 8/005* (2013.01)

(58) Field of Classification Search
  CPC ......... H04W 4/70; H04W 4/04; H04W 4/008; H04W 84/12; H04W 4/023; H04W 4/206; H04W 4/38; H04W 4/02; G01S 1/08

USPC ........... 340/539.11, 573.1, 517, 526, 539.13, 340/539.16, 541, 565, 9.11
See application file for complete search history.

(56) References Cited

U.S. PATENT DOCUMENTS

| | | | | |
|---|---|---|---|---|
| 2016/0088438 | A1* | 3/2016 | O'Keeffe | H04W 4/21 455/456.2 |
| 2016/0234649 | A1* | 8/2016 | Finnerty | G01S 1/08 |
| 2017/0055126 | A1* | 2/2017 | O'Keeffe | H04W 4/21 |

* cited by examiner

*Primary Examiner* — Toan N Pham
(74) *Attorney, Agent, or Firm* — Lessani Law Group, PC

(57) ABSTRACT

The present disclosure relates to a system and method for transmitting occupancy-related data from sensors to a remote server using smart phones instead of a gateway. Sensors in a building or other location collect and buffer occupancy-related data. Each sensor periodically generates an advertisement beacon with an identifier and a data payload that includes buffered occupancy-related data. The sensors wirelessly broadcast the advertisement beacons. A plurality of mobile devices (e.g., smartphones) execute an application that scans for advertisement beacons with the above-referenced identifier. In response to a mobile device with the application being in the vicinity of a sensor and detecting an advertisement beacon with the identifier, the mobile device forwards the advertisement beacon to a remote server, which uses the beacon's data payload to calculate the occupancy of a building or location.

21 Claims, 5 Drawing Sheets

SYSTEM, METHOD, AND COMPUTER PROGRAM FOR TRANSMITTING OCCUPANCY DATA FROM SENSORS TO A REMOTE SERVER

BACKGROUND OF THE INVENTION

1. Field of the Invention

This invention relates generally to systems that measure, transmit, and user building occupancy data and, more specifically, to a system and method for transmitting occupancy data from sensors to a remote server.

2. Description of the Background Art

Building occupancy estimates may be used to condition a building or to ensure efficient allocation of resources (e.g., office space, conference rooms, etc.). For example, building occupancy estimates may be used to promote efficient operation of a building's lighting system or a heating, ventilation, and air conditioning (HVAC) system.

Wireless sensors can provide data, such as temperate, CO2, etc., that can be used to calculate occupancy. Traditionally, wireless sensors require gateways to connect to a building management system or to the Internet. FIG. 1 illustrates a traditional system architecture with a gateway.

One challenge with the traditional architecture is that the gateway must be integrated with the building IT infrastructure. This can make installing and maintaining by a third-party provider more expensive and inefficient. Therefore, there is market demand for a system that transmit sensor data to the Internet or a building management system without a gateway.

SUMMARY OF THE DISCLOSURE

The present disclosure relates to a system and method for transmitting occupancy-related data from sensors to a remote server using smart phones instead of a gateway. Sensors in a building or other location collect and buffer occupancy-related data. Each sensor periodically generates an advertisement beacon (e.g., a BLE beacon) with an identifier and a data payload that includes buffered occupancy-related data. The sensors wirelessly broadcast the advertisement beacons.

A plurality of mobile devices (e.g., smartphones) execute an application that scans for advertisement beacons with the above-referenced identifier. In response to a mobile device with the application being in the vicinity of a sensor and detecting an advertisement beacon, the mobile device forwards the advertisement beacon to a remote server. The scanning and forwarding steps are performed automatically without user interaction or user initiative.

The remote server receives the advertisement beacons generated by the sensors and forwarded by the mobile device. The remote server uses the occupancy-related data in the payload to calculate the occupancy of a building or location.

DETAILED DESCRIPTION OF THE PREFERRED EMBODIMENTS

The present disclosure relates to a system and method for transmitting occupancy-related data from sensors to a remote server without the use of a gateway for the sensors. As described in more detail below, occupancy-related data is transmitted from sensors to a remote server via the smartphones of users within the vicinity of the sensors without any interaction from the users.

Figure 2A:
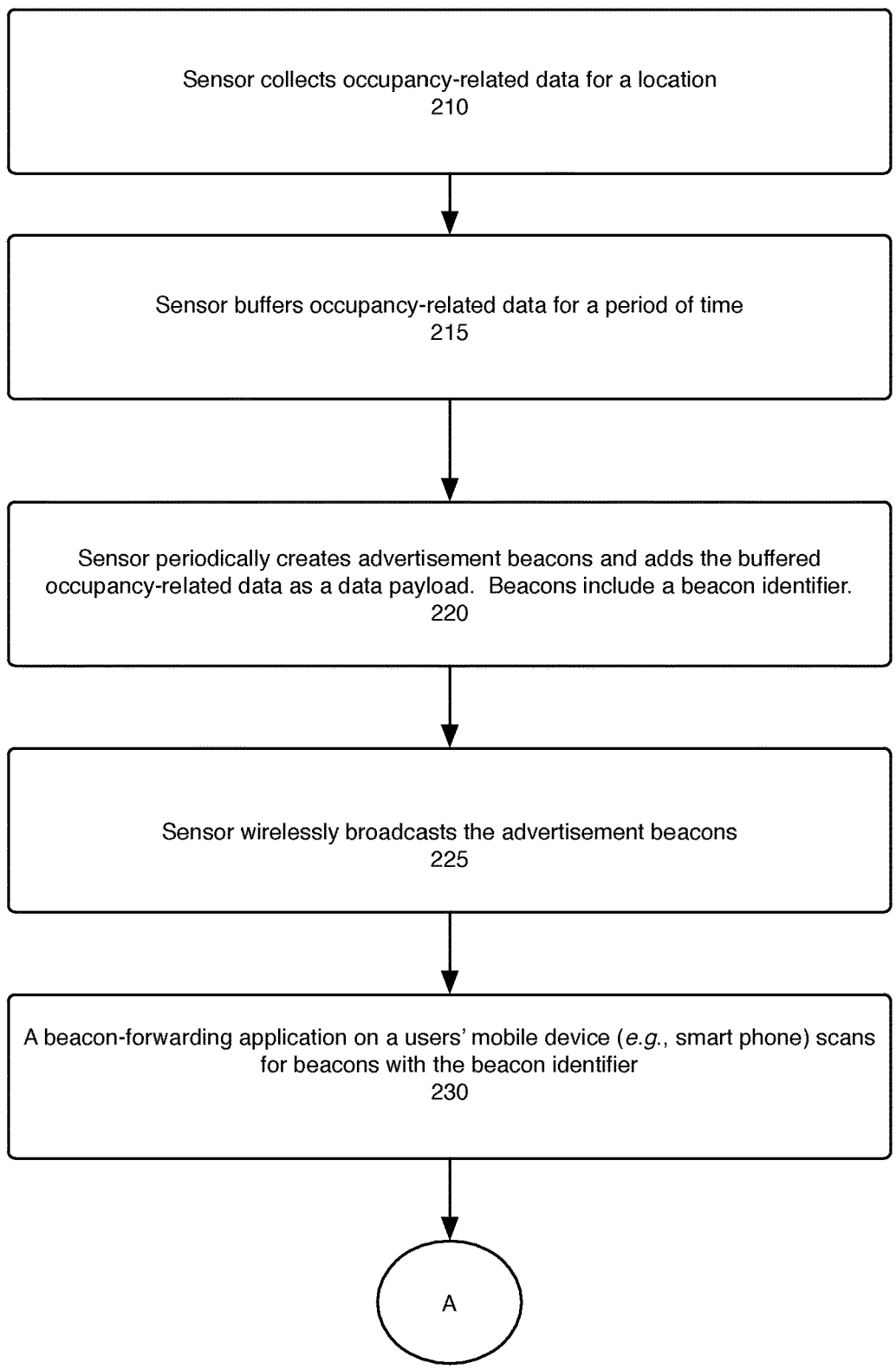
FIGS. 2A-2B are flowcharts that illustrate a method, according to one embodiment, for transmitting occupancy-related data from a sensor to a remote server using smartphones of users within the vicinity of the sensor.
Figure 2B:
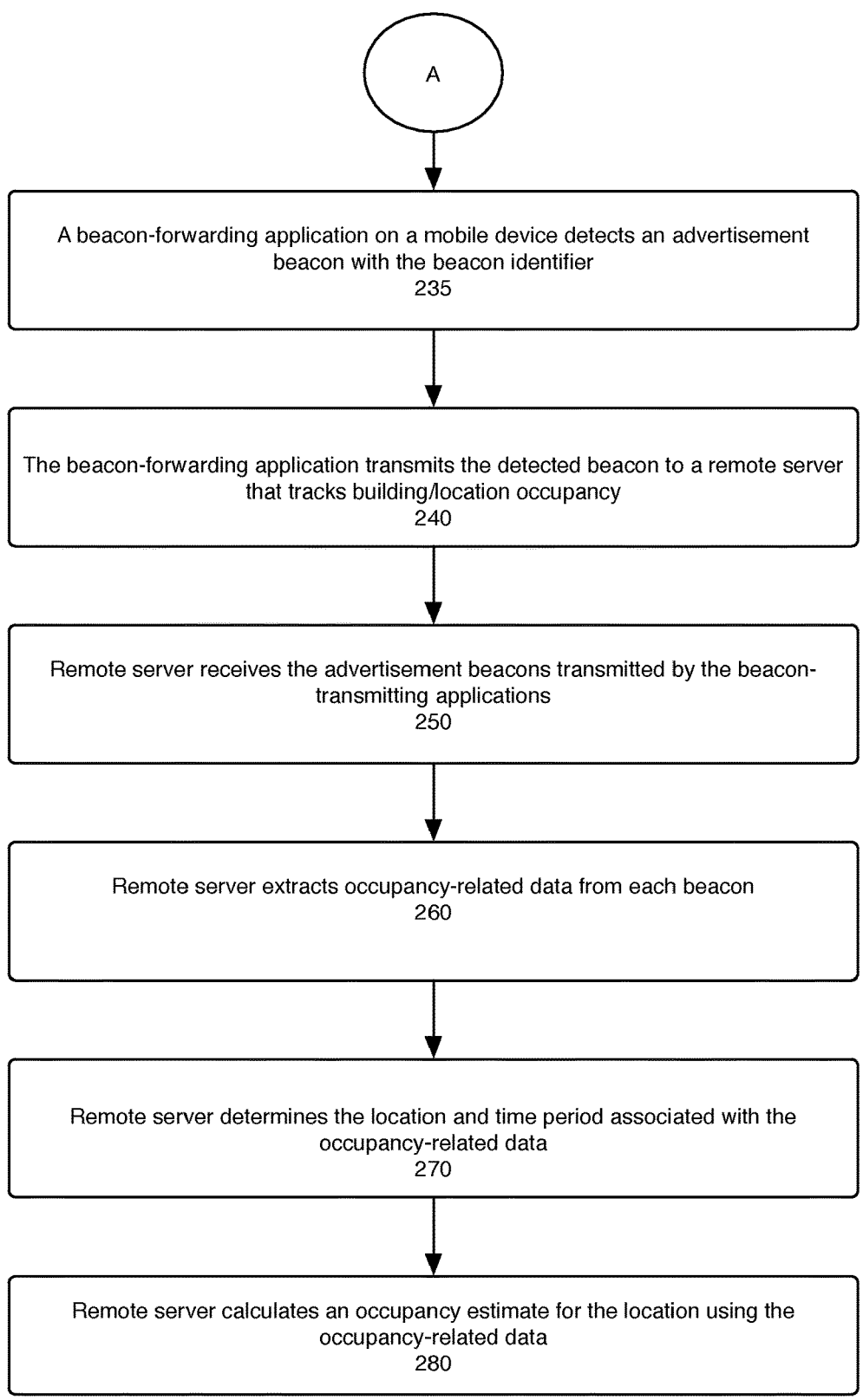

FIG. 2 illustrates a method for transmitting occupancy-related data from a sensor to a remote server using smartphones of users within the vicinity of the sensor. A sensor in a location (e.g., a room in a building) collects occupancy-related data for the location (step 210) and buffers it for a period of time (e.g., twenty-four hours) (step 215). Occupancy-related data is any data that allows occupancy of a room to be calculated or estimated. Examples of the type of sensors include passive infrared (PIR) sensors, $CO_2$ sensors, light sensors, indoor radar sensors, and thus, occupancy-related data may be infrared/motion data, CO2 data, light data, etc.

The sensor periodically creates advertisement beacons and adds buffered occupancy-related data to the advertisement beacon as a data payload (step 220). An advertisement beacon is a signal wirelessly broadcasted by a device (e.g., a sensor) in an area surrounding the device. The signal is broadcasted to a general area without a specific destination. The signal includes information that identifies the broadcasting device or its location. The advertisement beacon may be received by other devices in the area capable of receiving the beacon. An example of an advertisement beacon is a Bluetooth Low Energy (BLE) beacon, which is a wireless radio beacon.

The sensor periodically (e.g., every 500 ms) broadcasts wireless advertisement beacons with the occupancy-related data payload (step 225). This is a very different use of advertisement beacons, which typically transmit only a unique ID that enables an application to ascertain a user's location (e.g., determine that a user just entered a certain store). The advertisement beacons transmitted by the sensor include an identifier that is used by a beacon-forwarding smartphone application (discussed below) to recognize the beacons (a "beacon identifier").

A smartphone application is installed on users' phones (or other user mobile computing devices) and is configured to continuously or frequently scan for advertisement beacons with the beacon identifier (step 230). This application will be referred to herein as the "beacon-forwarding application," the "smartphone application," or "the application." In response to a beacon-forwarding application detecting an advertisement beacon with the beacon identifier, the application forwards the advertisement beacon, including the occupancy-related data payload, to the remote sever that tracks building/location occupancy (steps 235, 240). The advertisement beacon is forwarded without any user interaction or initiative. In other words, a user with the beacon-forwarding application on his smartphone merely has to walk by or be in the beacon range of the sensor for the beacon-forwarding application to send the beacon to the remote server. As advertisement beacons transmit through walls, the smartphone does not have to be in the same room as the sensor in order for the beacon-forwarding application to transmit advertisement beacons from the sensor. The beacon-forwarding application will likely detect multiple beacons when it is in the vicinity of the sensor, and it will transmit all the detected beacons with the applicable beacon identifier.

In one embodiment, the beacon-forwarding application is in a lower-power mode while scanning for advertisement beacons and switches to a higher-power mode in response to detecting an advertisement beacon with the applicable beacon identifier. After transmitting the beacon to the remote server, the beacon-forwarding application returns to the lower-power mode. Advertisement beacons are transmitted from user mobile devices to the remove server via a cellular or Wi-Fi (e.g., 802.11) connection.

The remote server receives the advertisement beacons transmitted by the beacon-transmitting applications (step 250), and it extracts occupancy-related data from each beacon (step 260). Data within each beacon enables the server to determine the location and time period associated with the occupancy-related data (step 270). In one embodiment, each beacon includes a header with a unique sensor ID (separate from the beacon identifier referenced above) that uniquely identifies the sensor that transmitted the beacon. A mapping of unique sensor IDs to geographical locations enables the sensor to determine the location from which the beacon was sent. In one embodiment, the unique sensor ID is the MAC address of the sensor. The beacon header may also include a time stamp and data fields that indicate the time period to which the occupancy data relates. For each location or for each building comprising multiple locations, the server calculates an occupancy estimate for the location/building over a period of time using the occupancy-related data payloads in received advertisement beacons (step 280). Methods for calculating occupancy estimates based on $CO_2$, light, or motion/infrared are known in the art. Some examples of such methods are described in the following article: Eldar Naghiyev, Mark Gillott, Robin Wilson, *Three unobtrusive domestic occupancy measurement technologies under qualitative review*, Energy and Buildings, Volume 69, February 2014, Pages 507-514, ISSN 0378-7788, the contents of which are incorporated by reference as if fully disclosed herein.

The remote server may be associated with a building control system that saves energy and/or improves occupancy comfort. For example, the remoter server may be associated with an HVAC control system, a lighting control system, an energy management system, and/or an office space/allocation management system. The occupancy estimates optimize the operation of such systems.

In one embodiment, the sensors transmit a rolling log of occupancy-related data. For example, the beacons may include the last twenty-four hours worth of occupancy-related data buffered by the sensor. In some cases, the sensor may rotate the occupancy-related data in the beacon payload. For example, one payload may include today's data, another payload may include yesterday's data (i.e., T-1), and a third payload may include T-2 days data. The different payloads may be rotated on a round-robin basis.

Each sensor compresses its occupancy-related data into the maximum packet size (e.g., currently 31 bytes) for a BLE beacon. In one embodiment, the sensors vary the data resolution over time, where more recent data is sent at a higher resolution than older data. For example, the data payload may include 1-minute sensor readings for the last 24 hours, hourly readings for the last 48 hours, and daily averages for the last week. Each bit in the payload may represent a period of time, or the data may be compressed using run-length encoding.

Some sensors may be plugged into an electric outlet and others may operate on battery power. For those sensors on battery power, it is ideal to transmit the occupancy-related data in a manner that minimizes power consumption. In one embodiment, a sensor reduces the frequency of beacon broadcasts during periods where no activity is detected (or activity is below a threshold).

Data compression also may be used to minimize the number of beacons transmitted by the sensors. In one embodiment, each bit in the payload represents a period of time (e.g., one bit per hour). The value of the bit (i.e., 1 or 0) represents whether a threshold amount of motion was detected in that period of time. This saves power as it requires less frequent beacon transmissions because a single payload can cover a longer period of time. The trade-off is that the data is being transmitted at a low resolution. Two-way communication (see discussion of FIG. 3 below) may be used to adjust the threshold.

In certain embodiments, the remote server checks each advertisement beacon to verify that a user's phone forwarded the beacon unmodified. The sensor inserts a key-hashed message authentication code (HMAC) in the advertisement beacon, and the remover server checks that the HMAC is valid. An example is the HMAC standard EG HMAC_MD5, which produces a 16-byte digest. The advantage of using HMAC is that it works with the small payload size (e.g., 31 bytes) of an advertisement beacon. Both the sensor and the remote server share a secret key that allows the sensor to generate the HMAC for the message advertisement beacon and allows the remote server to check that the HMAC is valid.

Figure 3:
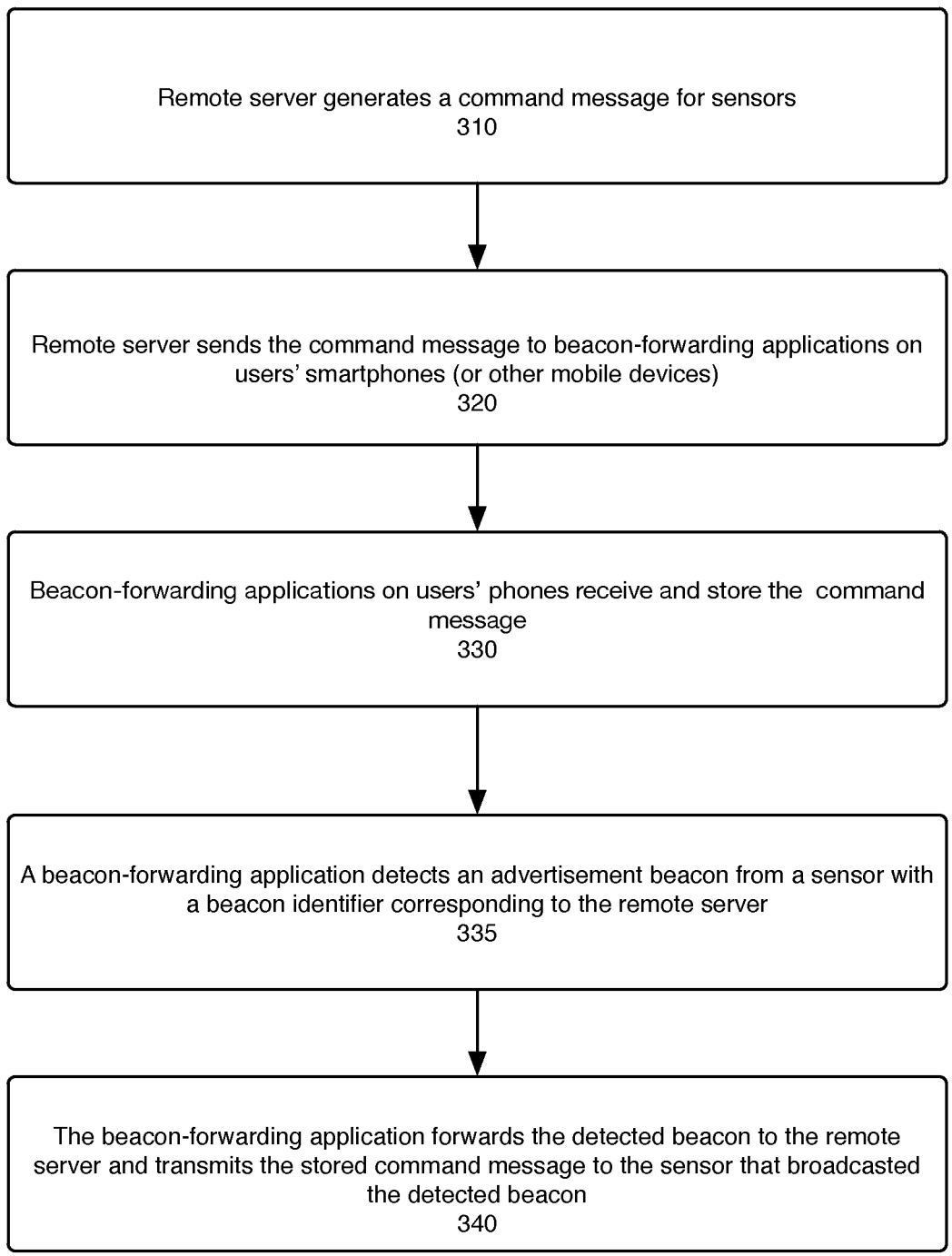
FIG. 3 is a flowchart that illustrates a method, according to one embodiment, for the remote server sending commands to sensors.

In certain embodiments, there are two-way communications between the sensors and the remote server. FIG. 3 illustrates a method for the remote server sending commands to sensors to enable two-way communicates between the remote server and the sensors. The remote server generates a command message for sensors with a select identifier (step 310). The remote server sends the command message to some or all the beacon-forwarding applications on users' phones (or on other user mobile computing devices) (step 320). The server specifies that the command message is only for sensors advertising a specific beacon identifier(s). The beacon-forwarding applications receive and store the command message (step 330). In response to a beacon-forwarding application on a user's phone (or other mobile computing device) detecting an advertisement beacon with the specified beacon identifier, the beacon-forwarding application sends the command message to the advertising sensor in addition to forwarding the detected advertisement beacon to the remote server (steps 335, 340). For example, if the sensors are blue tooth-enabled sensors, a beacon-forwarding application with a command message establishes a blue tooth communication session with a sensor in response to detecting an advertisement beacon with the specified beacon identifier from the sensor. The command message is then sent to the sensor over the blue tooth communication session. The command message may be user to update the software on the sensor, modify a transmission threshold, or send an actuation command.

In certain embodiments, the server determines which beacon-forwarding applications receive command messages based on the location of the beacon-forwarding applications.

The location of a beacon-forwarding application may be obtained from the applicable user's mobile client device or derived from the location of the sensors for which the beacon-forwarding application is forwarding advertisement beacons. In certain embodiments, the command message is deleted by the beacon-forwarding applications after a period of time (e.g., 30 days).

In certain embodiments, beacon-forward applications may acknowledge receipt of advertisement beacons to the advertising sensors, thereby enabling the sensors to stop advertising or delete data for which receipt has been acknowledged. In such case, a beacon-forwarding application establishes a communication session with a sensor in response to detecting an applicable advertisement beacon from the sensor, and then sends the receipt acknowledgement over the communication session.

Figure 1:
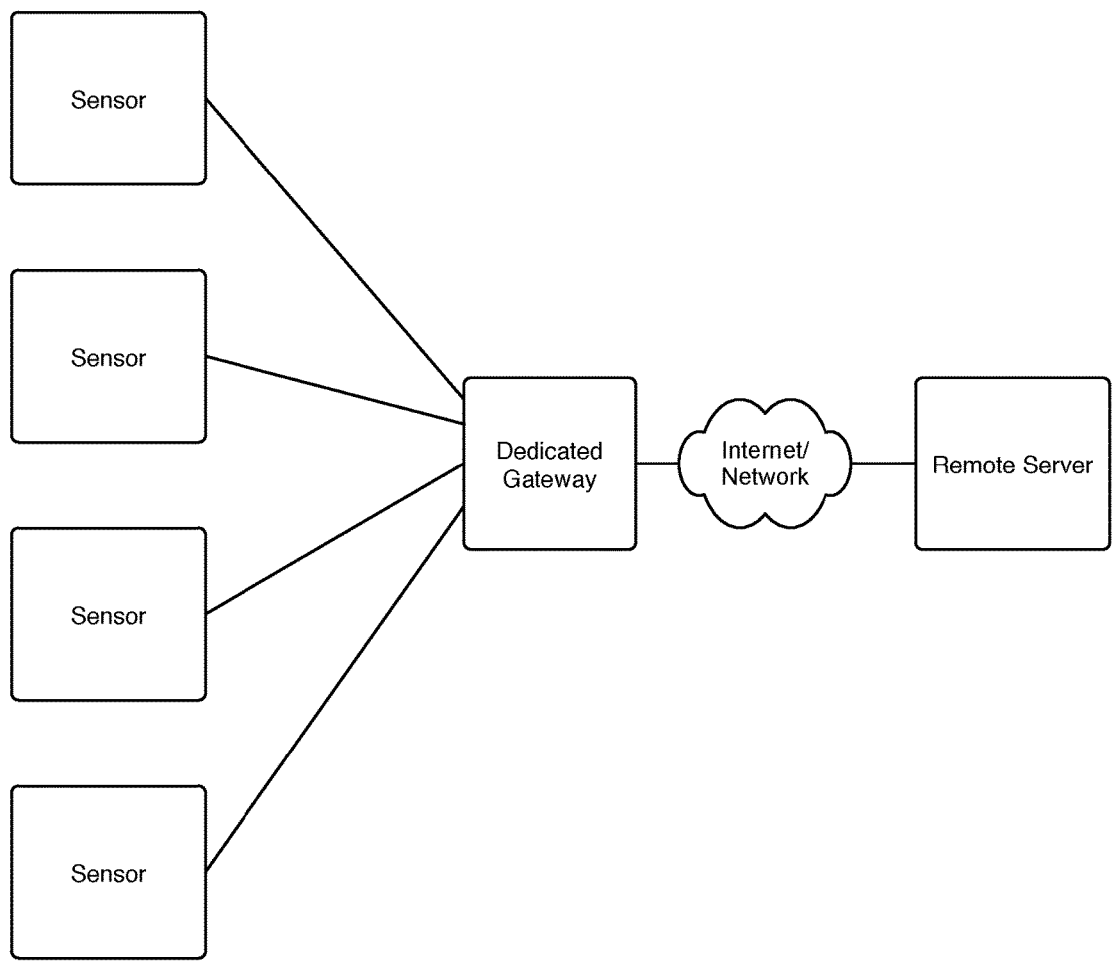
FIG. 1 is a block diagram that illustrates a prior art architecture
Figure 4:
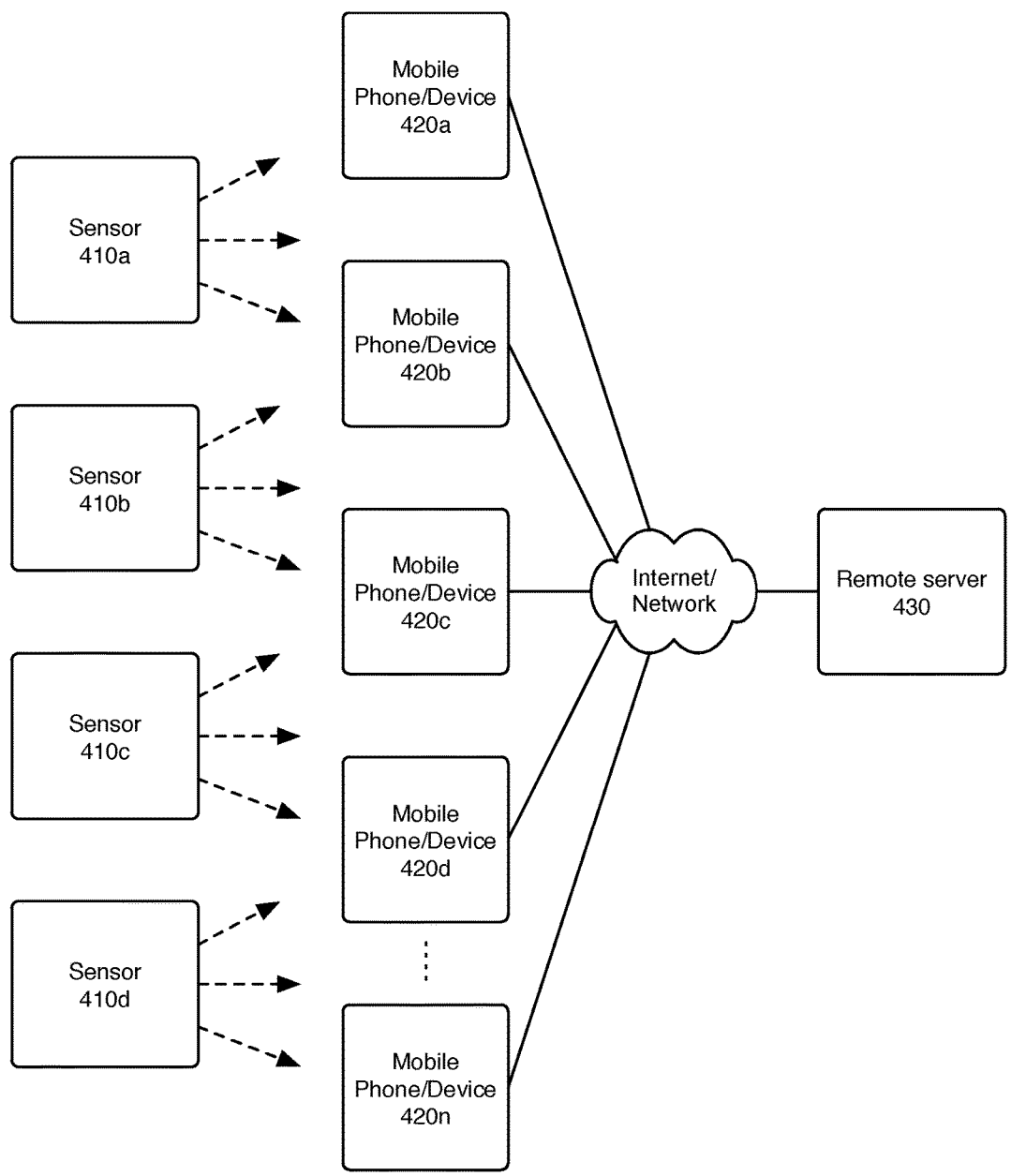
FIG. 4 is a is a block diagram that illustrates an example system architecture according to one embodiment.

FIG. 4 illustrates an example system architecture. Sensors 410a-d in a building wirelessly broadcast occupancy-related data. Unlike the sensors illustrated in FIG. 1, which have a direct connection to a network via a dedicated gateway, these sensors do not have a wired or wireless direct connection to a network. Sensors 410a-410d broadcast beacons to the space around them. Mobile phones or other mobile computing devices (e.g., tablets, smart watches, etc.) with the beacon-forwarding application 420a-n forward the occupancy-related data to a remote server 430 via the Internet and via a Wi-Fi or cellular connection. Multiple phones/devices may forward the same beacon to the remote server. For example, if mobile phones 420a and 420b are in the vicinity of sensor 410a at the same time, then, both mobile phones 420a and 420b forward the same beacons from sensor 410a to the remote server 430. Also, beacons from different sensors likely will be forwarded by different mobile phones with the application, as different users are likely to be in the vicinity of different sensors. As the mobile phones move with their users, the phones are not dedicated gateways for the sensors, and the sensors do not maintain a connection with the phones.

The remoter server 430 uses the occupancy-related data in the advertisement beacons to calculate the occupancy of locations in which sensors are located. The remote server may be part of a system that uses the occupancy calculations to condition a building (e.g., control HVAC systems), optimize light or energy use in a building, or efficiently allocate office space or office resources in a building or campus. An example of system that uses occupancy data to condition a building is the COMFY system by Building Robotics, Inc. (doing business as COMFY).

The methods described with respect to FIGS. 1-4 are embodied in software and performed by a computer system (comprising one or more computing devices) executing the software. A person skilled in the art would understand that a computing device has a memory or other physical, computer-readable storage medium for storing software instructions and one or more processors for executing the software instructions.

As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

The invention claimed is:

1. A method for transmitting occupancy-related data from sensor to a remote server, the method comprising:
collecting occupancy-related data on a sensor;
periodically generating, by the sensor, a plurality of advertisement beacons with an identifier; adding, by the sensor, occupancy-related data payloads to the advertisement beacons; wirelessly broadcasting, by the sensor, the advertisement beacons with the occupancy-related data payloads and the identifier; scanning on mobile devices for advertisement beacons with the identifier, wherein the scanning occurs without user notice or interaction; and in response to detecting an advertisement beacon with the identifier on a mobile device, automatically uploading, by the mobile device, the advertisement beacon and the corresponding occupancy-related data payload to the remote server; wherein the advertisement beacon is uploaded without user interaction.

2. The method of claim 1, further comprising:
receiving the advertisement beacons on the server;
determining a location associated with each received advertisement beacon; and
calculating, by server, an occupancy estimate for a location over a period of time using the occupancy-related data payloads in the received advertisement beacons corresponding to the location.

3. The method of claim 1, wherein the occupancy-related data comprises data related to one of the following sensed parameters in a location: infrared light, carbon dioxide, temperature, or light.

4. The method of claim 1, wherein the sensor buffers the occupancy-related data for a period of time and wherein the sensor rotates the occupancy-related data in the data payload to cover multiple time periods across the plurality of advertisement beacons.

5. The method of claim 1, wherein, to minimize power usage, the sensor transmits advertisement beacons less frequently when no activity is sensed and more frequently when activity is sensed.

6. The method of claim 1, wherein the advertisement beacon is a BLE beacon.

7. The method of claim 1, wherein the scanning and uploading steps are performed by an application executing on the mobile device, and wherein the application is in a lower power mode when scanning and switches to a higher power method in response to detecting an advertisement beacon with the identifier.

8. A system for transmitting occupancy-related data from a sensor to a remote server, the system comprising:
a sensor having a non-transitory processor-readable medium comprising a computer program that, when executed by a processor on the sensor, causes the sensor to perform the following method:
collecting occupancy-related data;
periodically generating a plurality of advertisement beacons with an identifier; adding occupancy-related data payloads to the advertisement beacons; and periodically broadcasting the advertisement beacons with the occupancy-related data payloads and the identifier;
and a mobile computing device having a non-transitory computer-readable medium comprising a computer program that, when executing by the mobile computing device, enables the mobile computing device to perform the following method for receiving and forward communications from the sensor:
scanning for advertisement beacons with the identifier, wherein the scanning occurs without user notice or interaction; and in response to detecting an advertisement beacon with the identifier on a mobile device, automatically uploading the advertisement beacon with the identifier and the occupancy-related data to a server, wherein the advertisement beacon and corresponding occupancy-related data is uploaded without user interaction.

9. The system of claim 8, further comprising:
a server having a second non-transitory computer readable medium comprising a computer program that, when executed by the server, enables the server to perform the following method for receiving occupancy related data from the mobile computing device and determining the occupancy of a location, the method comprising:
  receiving uploaded advertisement beacons;
  determining a location associated with each received advertisement beacon; and
  calculating an occupancy estimate for a location over a period of time using the occupancy-related data payloads in the received advertisement beacons corresponding to the location.

10. The system of claim 8, wherein the occupancy-related data comprises data related to one of the following sensed parameters in a location: infrared light, carbon dioxide, temperature, or light.

11. The system of claim 8, wherein the sensor buffers the occupancy-related data for a period of time and wherein the sensor rotates the occupancy-related data in the data payload to cover multiple time periods across the plurality of advertisement beacons.

12. The system of claim 8, wherein, to minimize power usage, the sensor transmits advertisement beacons less frequently when no activity is sensed and more frequently when activity is sensed.

13. The system of claim 8, wherein the advertisement beacon is a BLE beacon.

14. The system of claim 8, wherein the scanning and uploading steps are performed by an application executing on the mobile computing device, and wherein the application is in a lower power mode when scanning and switches to a higher power mode in response to detecting an advertisement beacon with the identifier.

15. A system for transmitting occupancy-related data from a sensor to a remote server, the system comprising:
  a first non-transitory processor-readable medium comprising a computer program that, when executed by a processor on the sensor, causes the sensor to perform the following method:
  collecting occupancy-related data;
  periodically generating a plurality of advertisement beacons with an identifier; adding occupancy-related data payloads to the advertisement beacons; and
  periodically broadcasting the advertisement beacons with the occupancy-related data payloads and the identifier; and
  a second non-transitory computer-readable medium comprising a computer program that, when executing by a mobile computing device, enables the mobile computing device to perform the following method for receiving and forward communications from the sensor:
  scanning for advertisement beacons with the identifier, wherein the scanning occurs without user notice or interaction; and in response to detecting an advertisement beacon with the identifier on a mobile computing device, automatically uploading the advertisement beacon with the identifier and the occupancy-related data to a server; wherein the advertisement beacon and corresponding occupancy-related data is uploaded without user interaction.

16. The system of claim 15, further comprising:
a second non-transitory computer readable medium comprising a computer program that, when executed by the server, enables the server to perform the following method for receiving occupancy related data from the mobile computing device and determining the occupancy of a location, the method comprising: receiving uploaded advertisement beacons; and
determining the location associated with each received advertisement beacon;
calculating an occupancy estimate for the location over a period of time using the occupancy-related data payloads in the received advertisement beacons corresponding to the location.

17. The system of claim 15, wherein the occupancy-related data comprises data related to one of the following sensed parameters in the location: infrared light, carbon dioxide, temperature, or light.

18. The system of claim 15, wherein the sensor buffers the occupancy-related data for a period of time and wherein the sensor rotates the occupancy-related data in the data payload to cover multiple time periods across the plurality of advertisement beacons.

19. The system of claim 15, wherein, to minimize power usage, the sensor transmits advertisement beacons less frequently when no activity is sensed and more frequently when activity is sensed.

20. The system of claim 15, wherein the advertisement beacon is a BLE beacon.

21. The system of claim 15, wherein the scanning and uploading steps are performed by an application executing on the mobile computing device, and wherein the application is in a lower power mode when scanning and switches to a higher power mode in response to detecting an advertisement beacon with the identifier.

* * * * *